(12) United States Patent
Lee

(10) Patent No.: US 11,662,608 B2
(45) Date of Patent: May 30, 2023

(54) HYBRID TYPE LENS AND GLASSES FOR PROVIDING VARIFOCAL FOCUS

(71) Applicant: Min Ho Lee, Gyeonggi-do (KR)

(72) Inventor: Min Ho Lee, Gyeonggi-do (KR)

(73) Assignee: Min Ho Lee, Gyeonggi-do (KR)

( * ) Notice: Subject to any disclaimer, the term of this patent is extended or adjusted under 35 U.S.C. 154(b) by 296 days.

(21) Appl. No.: 17/167,770

(22) Filed: Feb. 4, 2021

(65) Prior Publication Data

US 2021/0247627 A1    Aug. 12, 2021

(30) Foreign Application Priority Data

Feb. 11, 2020    (KR) .......................... 10-2020-0016202

(51) Int. Cl.
*G02C 7/08*    (2006.01)
*B29D 11/00*    (2006.01)

(52) U.S. Cl.
CPC ........ *G02C 7/083* (2013.01); *B29D 11/00009* (2013.01)

(58) Field of Classification Search
None
See application file for complete search history.

(56) References Cited

U.S. PATENT DOCUMENTS

| | | | | |
|---|---|---|---|---|
| 6,165,392 A * | 12/2000 | Kobuchi | ........... | B29C 45/14065 264/1.32 |
| 7,475,985 B2 * | 1/2009 | Blum | ................... | A61B 3/0285 351/159.42 |
| 8,587,734 B2 * | 11/2013 | Li | .............................. | G02F 1/29 351/159.6 |
| 10,989,926 B1 * | 4/2021 | Matsuda | .............. | G02B 27/283 |
| 2002/0158866 A1 * | 10/2002 | Batchko | ............... | H04N 13/388 345/419 |
| 2012/0244246 A1 * | 9/2012 | Nielsen | .................. | B82Y 10/00 264/220 |

(Continued)

FOREIGN PATENT DOCUMENTS

| | | |
|---|---|---|
| JP | 2017515139 A | 6/2017 |
| KR | 1020120033696 A | 4/2012 |
| KR | 1020190017935 A | 2/2019 |

OTHER PUBLICATIONS

Office Action dated Feb. 18, 2021 for Korea Patent Application No. 10-2020-0016202, 6 pgs.

*Primary Examiner* — Ryan Crockett
(74) *Attorney, Agent, or Firm* — Umberg Zipser LLP; Ryan Dean

(57) ABSTRACT

According to some exemplary embodiments of the present disclosure, provided is a lens for providing varifocal focus. The lens for providing the varifocal focus may include: a liquid crystal layer that is variably oriented according to a voltage to have a variable refractive index; a first lens-shaped optical unit including a first optical layer having one side in contact with one side of the liquid crystal layer and a second optical layer having one side in contact with the other side of the liquid crystal layer; and a second lens-shaped optical unit made of a polymer series, having a fixed refractive index, and including a third optical layer having one side in contact with an outer surface of the first optical layer and a fourth optical layer having one side in contact with an outer surface of the second optical layer.

13 Claims, 6 Drawing Sheets

(a)

(b)

(56) References Cited

U.S. PATENT DOCUMENTS

| | | | | |
|---|---|---|---|---|
| 2015/0378067 A1* | 12/2015 | Stevens | .................. | G02C 7/085 |
| | | | | 359/666 |
| 2016/0170097 A1* | 6/2016 | Milton | ................... | G02C 7/041 |
| | | | | 349/200 |
| 2017/0068134 A1* | 3/2017 | Yadin | ................ | G02F 1/134309 |
| 2017/0357141 A1* | 12/2017 | De Smet | .......... | B29D 11/00817 |
| 2020/0133015 A1* | 4/2020 | Urzhumov | ......... | G02B 27/0961 |
| 2021/0389513 A1* | 12/2021 | Wang | .................. | G02B 5/3016 |

* cited by examiner

[Fig. 1]
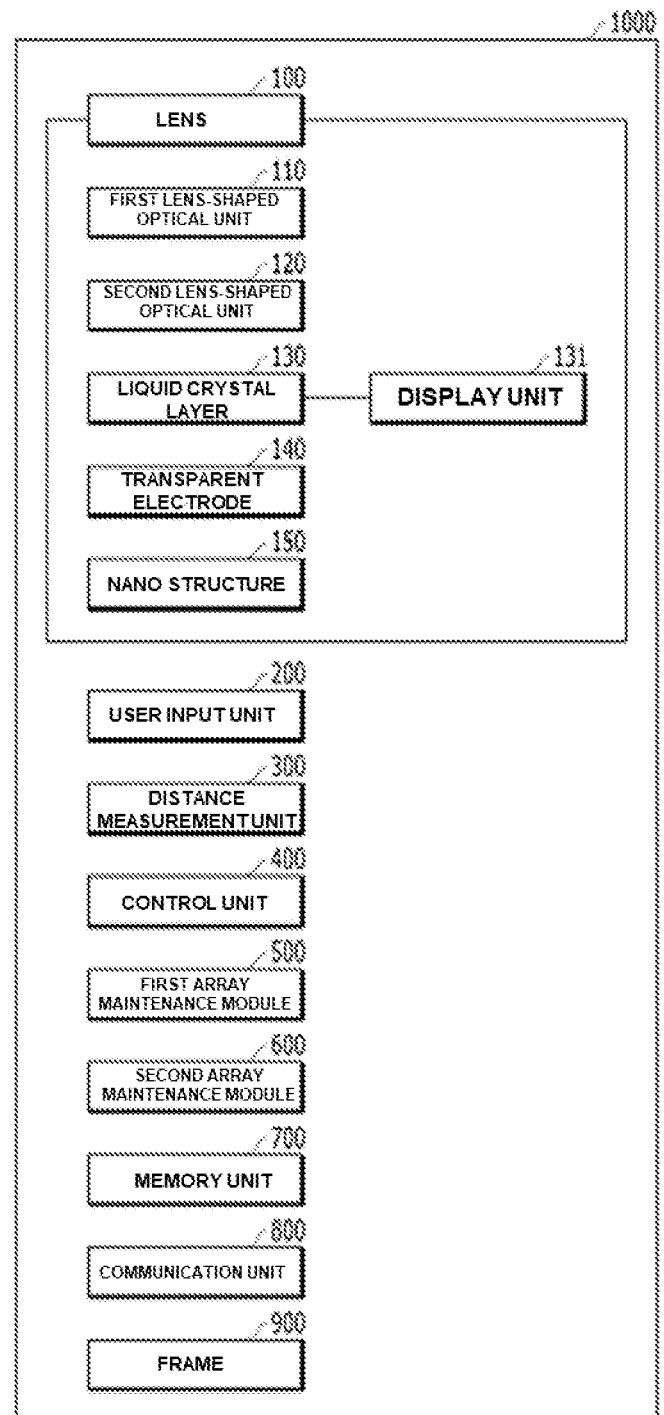

[Fig. 2]
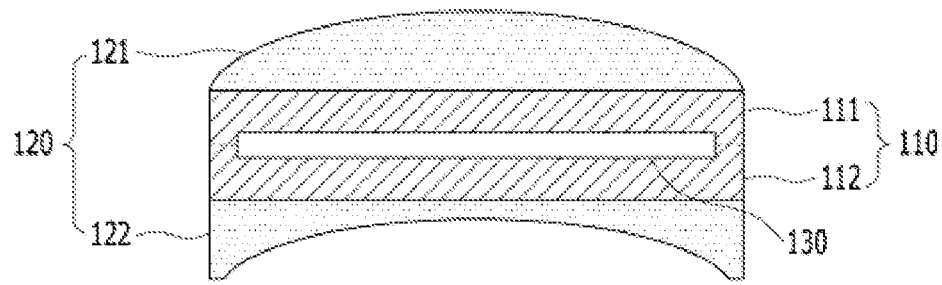
[Fig. 3]
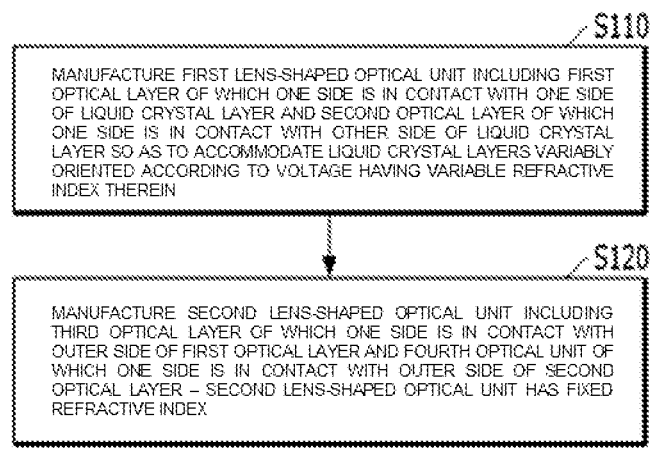

[Fig. 4]
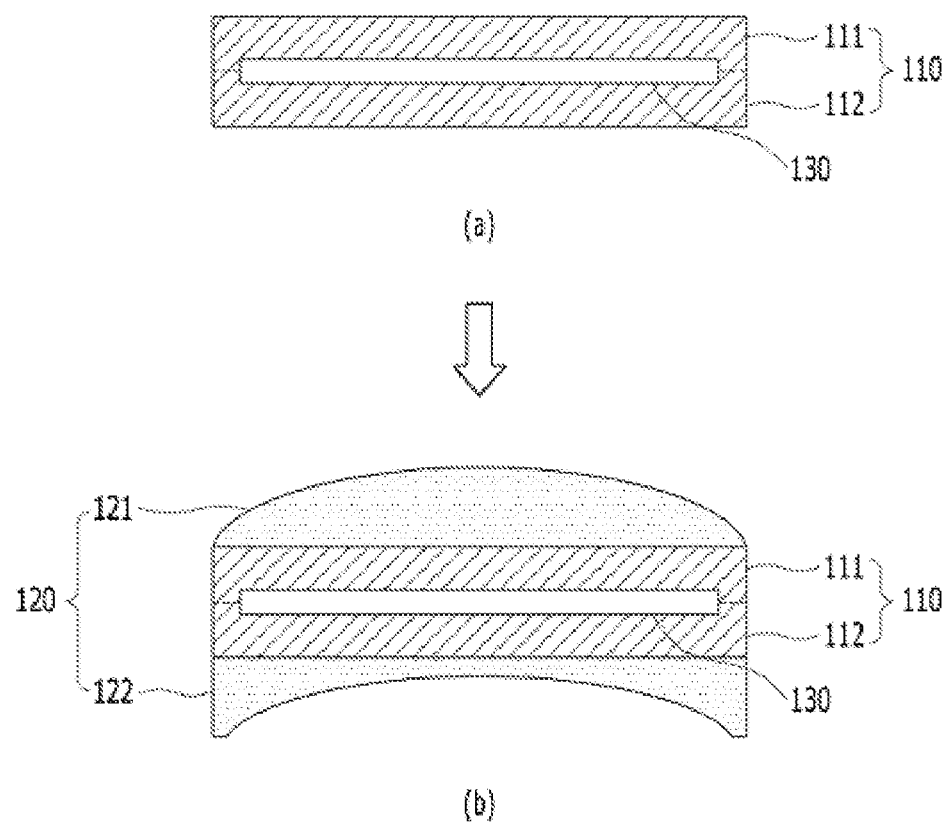

[Fig. 5]
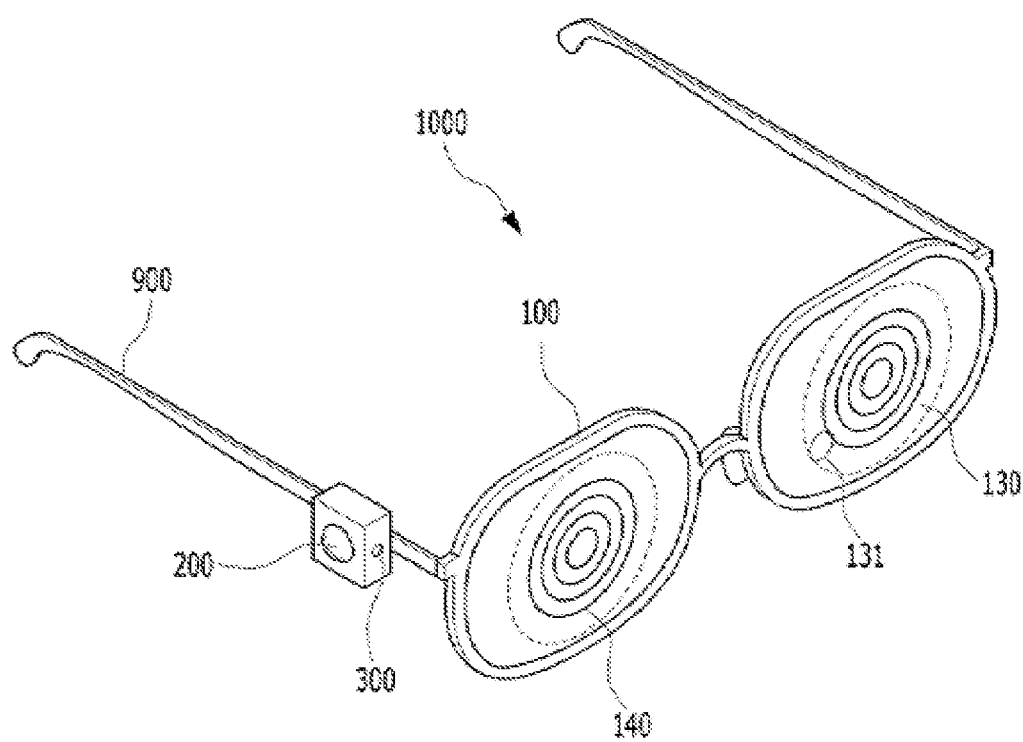

[Fig. 6a]
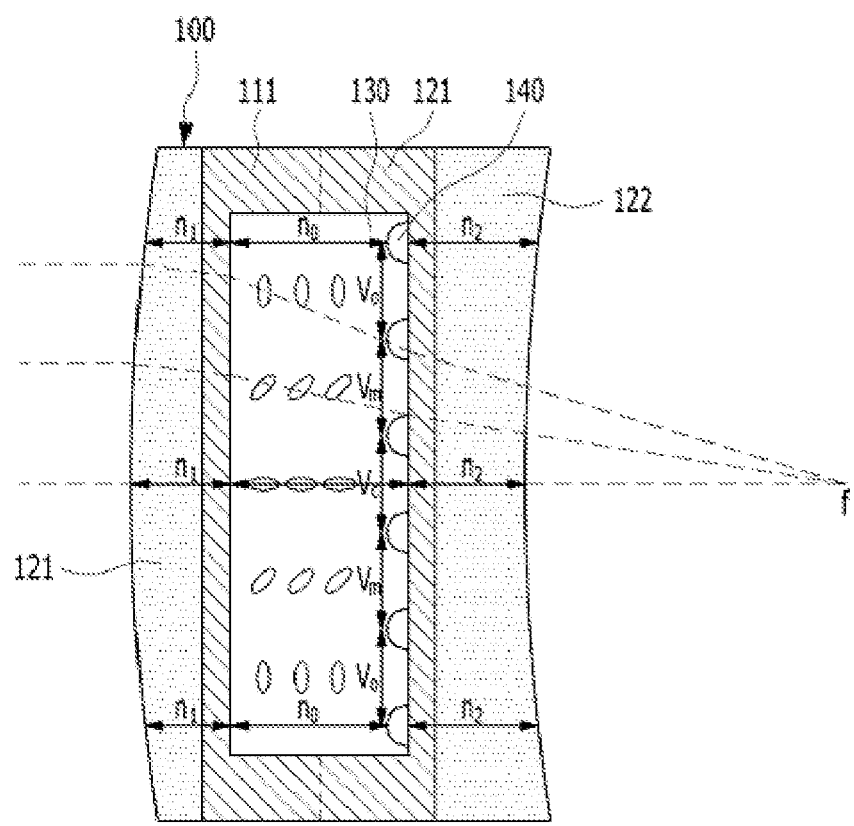

【Fig. 6b】
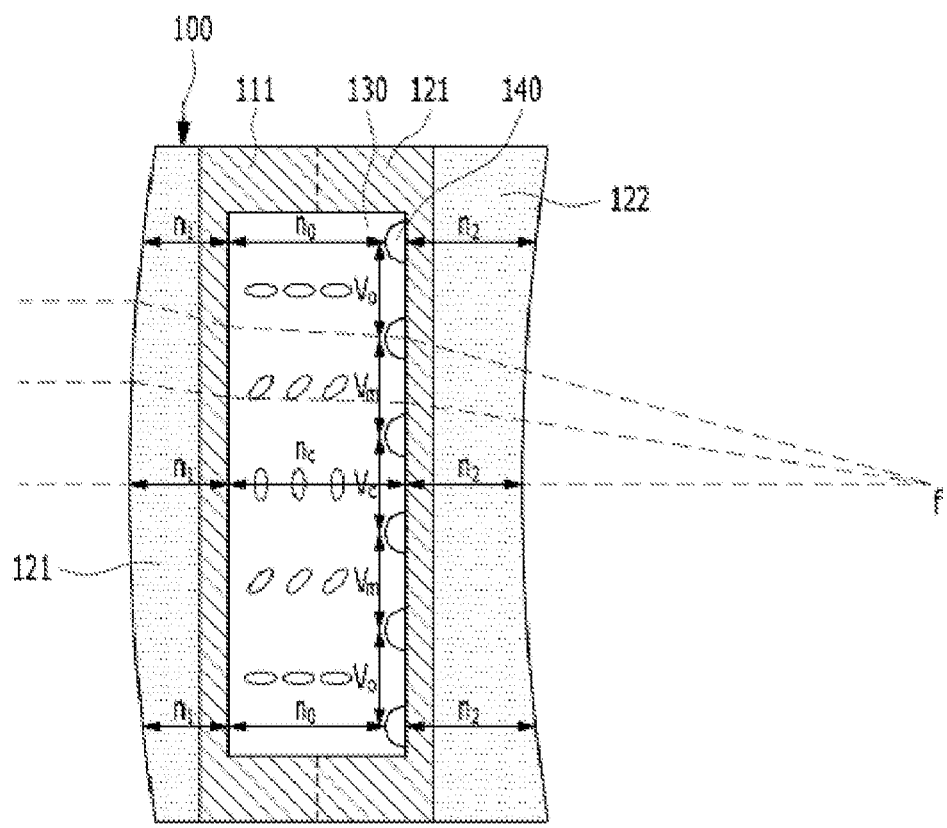

HYBRID TYPE LENS AND GLASSES FOR PROVIDING VARIFOCAL FOCUS

CROSS-REFERENCE TO RELATED APPLICATIONS

This application claims priority to and the benefit of Korean Patent Application No. 10-2020-0016202 filed in the Korean Intellectual Property Office on Feb. 11, 2020, the entire contents of which are incorporated herein by reference.

TECHNICAL FIELD

The present disclosure relates to eyeglasses and a lens, and more particularly, to hybrid glasses and lenses for providing varifocal focus by using liquid crystals.

BACKGROUND ART

Presbyopia refers to a gradual decline in a control power function of an eye lens around the age of 40 or 45. The elasticity of the eye lens deteriorates or the eye lens is enlarged, and a near visual life range is reduced, making it difficult to see objects located at a close distance. Therefore, fatigue is felt when reading or at rest.

Conventional lenses used for vision correction include one or more fixed focus control magnifications. For example, people with symptoms of presbyopia in which the eye lens loses elasticity and close-range focus control is impaired use ophthalmic devices that provide different fixed magnifications for near and far vision. The lens with the fixed focus control magnification limits a lens' vision correction possibility to a standard magnification and position within the lens.

For vision correction, a single focal lens, a bifocal lens, and a multifocal lens are used. The single focal lens as a lens that corrects only a short distance or a long distance has an inconvenience that a user should change and wear eyeglasses corresponding to each distance. The bifocal lens may correct the short distance and the long distance. The bifocal lens may see the short distance and the long distance according to the position of a gaze of a wearer by varying a refractive index of a specific area of the lens, but has an inconvenience that since a peripheral portion of the gaze is not corrected, the wearer easily feels the fatigue and should adjust the position of the gaze or fix and wear the eyeglasses. Further, the bifocal lens may be accompanied by dizziness when looking at a close place after going down stairs or looking at a distance place and in this case, an image leap phenomenon may appear and there is a problem in appearance due to a boundary between a part for the short distance and a part for the long distance. The multifocal lens as a lens including a short-distance part, a progressive part, and a long-distance part has less image leap phenomenon and dizziness phenomenon than the bifocal lens and may see the short distance, an intermediate distance, and the long distance due to a continuous change in refractive index from the long distance to the short distance. However, in the case of the multifocal lens, since multiple sights overlap in a narrow lens area, areas of the progressive part and the short-distance part are narrow and an image blurring or shaking phenomenon is more severe than that of the bifocal lens when lateral viewing due to distortion aberration and astigmatism in a lateral part of a progressive zone and the progressive zone used for specifying the intermediate distance is narrow and unstable, and as a result, long-time stable usage is impossible and it is inconvenient due to a narrow gaze of the short-distance part.

In solving the problem, a varifocal lens that varies the focus in a single area is attracting public attention. However, as the varifocal lens has a problem in that a peak to valley value (PV value) increases during a process of curing a liquid crystal layer for alignment, a product yield is lowered, and as a result, it is difficult to mass-produce the varifocal lens.

Therefore, there may be a demand in the art for a mass-producible varifocal lens and a manufacturing method thereof.

SUMMARY OF THE INVENTION

The present disclosure has been made in an effort to provide a mass-producible lens with a variable refractive index.

The present disclosure has been made in an effort to provide eyeglasses capable of providing various focal distances without implementing multiple focuses by dividing an area of a lens.

The present disclosure has been made in an effort to provide mass-producible eyeglasses having a lens capable of providing multiple focuses by using liquid crystals driven by electricity.

An exemplary embodiment of the present disclosure provides a lens for providing varifocal focus. The lens for providing varifocal focus may include: a liquid crystal layer that is variably oriented according to a voltage to have a variable refractive index; a first lens-shaped optical unit including a first optical layer having one side in contact with one side of the liquid crystal layer and a second optical layer having one side in contact with the other side of the liquid crystal layer; and a second lens-shaped optical unit having a fixed refractive index, and including a third optical layer having one side in contact with an outer surface of the first optical layer and a fourth optical layer having one side in contact with an outer surface of the second optical layer.

Further, the second lens-shaped optical unit may be manufactured by an imprinting process on the first lens-shaped optical unit.

In addition, the second lens-shaped optical unit may be manufactured by an insert process on the first lens-shaped optical unit.

Further, a range of the variable refractive index may be determined based on a user's presbyopia vision, and the fixed refractive index may be determined based on the user's basic vision.

In addition, the liquid crystal layer may have a first refractive index for correcting a user's basic vision in an off state, and a second refractive index for correcting the user's presbyopia vision in an on state.

Further, the first lens-shaped optical unit may be made of glass or film, and the second lens-shaped optical unit may be made of a polymer-based material.

Further, the lens for providing varifocal focus may further include a transparent electrode configured in a predetermined pattern so as to apply a voltage according to a position on the lens to the liquid crystal layer, and positioned on one side of the first lens-shaped optical unit.

Another exemplary embodiment of the present disclosure provides a method of manufacturing a lens for providing varifocal focus. The method of manufacturing a lens for providing varifocal focus may include: manufacturing a first lens-shaped optical unit including a first optical layer having one side in contact with one side of a liquid crystal layer and a second optical layer having one side in contact with the other side of the liquid crystal layer, so as to accommodate therein the liquid crystal layer that is variably oriented according to a voltage to have a variable refractive index; and manufacturing a second lens-shaped optical unit including a third optical layer having one side in contact with an outer surface of the first optical layer and a fourth optical layer having one side in contact with an outer surface of the second optical layer, in which the second lens-shaped optical unit has a fixed refractive index.

Further, the second lens-shaped optical unit may be manufactured by an imprinting process on the first lens-shaped optical unit.

In addition, the second lens-shaped optical unit may be manufactured by an insert process on the first lens-shaped optical unit.

Yet another exemplary embodiment of the present disclosure provides eyeglasses for providing varifocal focus. The eyeglasses for providing the varifocal focus may include: a lens for providing varifocal focus; and a frame coupled to a part of the lens to fix the lens, and having a shape to be worn by a user of the eyeglasses, in which the lens may include: a liquid crystal layer that is variably oriented according to a voltage to have a variable refractive index; a first lens-shaped optical unit including a first optical layer having one side in contact with one side of the liquid crystal layer and a second optical layer having one side in contact with the other side of the liquid crystal layer; and a second lens-shaped optical unit having a fixed refractive index, and including a third optical layer having one side in contact with an outer surface of the first optical layer and a fourth optical layer having one side in contact with an outer surface of the second optical layer.

Further, the second lens-shaped optical unit may be manufactured by an imprinting process on the first lens-shaped optical unit.

In addition, the second lens-shaped optical unit may be manufactured by an insert process on the first lens-shaped optical unit.

According to an exemplary embodiment of the present disclosure, a mass-producible lens with a variable refractive index can be provided.

According to an exemplary embodiment of the present disclosure, eyeglasses can be provided, which are capable of providing various focal distances without implementing multiple focuses by dividing an area of a lens.

According to an exemplary embodiment of the present disclosure, mass-producible eyeglasses having a lens capable of providing multiple focuses by using liquid crystals driven by electricity can be provided.

BRIEF DESCRIPTION OF THE DRAWINGS

FIG. 1 is a block diagram of eyeglasses for providing a varifocal focus according to some exemplary embodiments of the present disclosure.

FIG. 2 is a side cross-sectional view of a lens according to some exemplary embodiments of the present disclosure.

FIG. 3 is a diagram for describing a method for manufacturing a lens for providing a varifocal focus according to some exemplary embodiments of the present disclosure.

FIG. 4 is a diagram for describing a semi-finished lens and a finished lens according to some exemplary embodiments of the present disclosure.

FIG. 5 is a perspective view illustrating an example of an external appearance of eyeglasses for providing a varifocal focus according to some exemplary embodiments of the present disclosure.

FIG. 6A is a diagram illustrating that lenses of eyeglasses operate to correct hyperopia according to some exemplary embodiment of the present disclosure.

FIG. 6B is a diagram illustrating that lenses of eyeglasses operate to correct myopia according to the present disclosure.

DETAILED DESCRIPTION

Various exemplary embodiments will now be described with reference to drawings and like reference numerals are used to refer to like elements throughout all drawings. In the present specification, various descriptions are presented to provide appreciation of the present disclosure. However, it is apparent that the exemplary embodiments can be executed without the specific description. In other examples, known structures and apparatuses are presented in a block diagram form in order to facilitate description of the exemplary embodiments.

"Component", "module", "system", and the like which are terms used in the specification refer to a computer-related entity, hardware, firmware, software, and a combination of the software and the hardware, or execution of the software. For example, the component may be a processing process executed on a processor, the processor, an object, an execution thread, a program, and/or a computer, but is not limited thereto. For example, both an application executed in a computing device and the computing device may be the components. One or more components may reside in the processor and/or the execution thread and one component may be localized in one computer or distributed among two or more computers. Further, the components may be executed by various computer-readable media having various data structures, which are stored therein. The components may perform communication through local and/or remote processing according to a signal (for example, data from one component that interacts with other components and/or data from other systems through a network such as the Internet through a signal in a local system and a distribution system) having one or more data packets, for example.

The description of the presented exemplary embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the embodiments presented herein, but should be interpreted within the widest range which is coherent with the principles and new features presented herein.

FIG. 1 is a block diagram of eyeglasses for providing a varifocal focus according to some exemplary embodiments of the present disclosure. FIG. 2 is a side cross-sectional view of a lens for providing a varifocal focus according to some exemplary embodiments of the present disclosure.

Eyeglasses 1000 for providing a varifocal focus according to some exemplary embodiments of the present disclosure may include a lens 100, a user input unit 200, a distance measurement unit 300, a control unit 400, a first array maintenance module 500, a second array maintenance module 600, a memory unit 700, a communication unit 800, and a frame 900.

The lens 100 according to some exemplary embodiments of the present disclosure may include a first lens-shaped optical unit 110, a second lens-shaped optical unit 120, a liquid crystal layer 130, a display unit 131, a transparent electrode 140, and a nano structure 150. The structure of the aforementioned lens 100 is just an example and any one component of the aforementioned components may be removed or an arbitrary component may be added.

The lens 100 according to some exemplary embodiments of the present disclosure may be a varifocal lens having a hybrid form. Specifically, the lens 100 according to some exemplary embodiments of the present disclosure may be constituted by an internal layer (i.e., the first lens-shaped optical unit) manufactured by glass series (or film) to accommodate a liquid crystal layer providing a varifocal focus therein in order to correct presbyopia vision and an external layer (i.e., the second lens-shaped optical unit) manufactured by polymer series providing a fixed refractive index in order to correct basic vision. The internal layer that accommodates the liquid crystal layer therein is manufactured by glass series (or film), and as a result, the lens according to some exemplary embodiments of the present disclosure may acquire an even product yield even after a curing operation for orientating the liquid crystal layer. Therefore, the lens is advantageous for mass production.

Further, the lens according to some exemplary embodiments of the present disclosure is configured to correct variable vision (presbyopia vision) by the liquid crystal layer accommodated in the internal layer and correct the basic vision by the external layer, and as a result, a semi-finished product is selected in which only an internal layer having a suitable variable refractive index is manufactured according to the presbyopia vision of a user and a suitable external layer is post-finished through an imprinting process or an insert molding process according to the basic vision of the user on a pre-manufactured semi-finished product, and as a result, the lens may be finally finished, thereby increasing mass productivity of the varifocal lens.

According to some exemplary embodiments of the present disclosure, the first lens-shaped optical unit 110 may include a first optical layer 111 and a second optical layer 112. One side of each of the first optical layer 111 and the second optical layer 112 may be disposed in contact with the liquid crystal layer 130. In other words, the lens 100 may be a structure in which the liquid crystal layer 130 is accommodated between the first optical layer 111 and the second optical layer 112 of the first lens-shaped optical unit 110. Further, a transparent electrode 140 may be positioned on one side of the first lens-shaped optical unit 110. For example, the transparent electrode 140 may be positioned on the inner surface of the first optical layer 111 or the second optical layer 112 which is in contact with the liquid crystal layer and in this case, the transparent electrode 140 may apply a voltage onto the liquid crystal layer 130.

It is illustrated in FIG. 2 that each of the first optical layer 111 and the second optical layer 112 is constituted by a single layer, but the first optical layer 111 or the second optical layer 112 may be constituted by a plurality of layers. For example, the first optical layer 111 or the second optical layer 112 may be constituted by a plurality of layers including a layer for granting the fixed refractive index. As another example, the first optical layer 111 or the second optical layer 112 may be constituted by a plurality of layers including a layer for correcting astigmatism. However, the present disclosure is not limited thereto, and the first optical layer 111 and the second optical layer 112 may be constituted by various numbers of layers in order to perform various functions.

As illustrated in FIG. 2, the first lens-shaped optical unit 110 may have an aspherical shape. For example, the inner surface of each of the first optical layer 111 and the second optical layer 112 in contact with the liquid crystal layer 130 may be configured by a plane. For example, the outer surface of each of the first optical layer 111 and the second optical layer 112 in contact with the second lens-shaped optical unit may be configured by a plane. In this case, the first lens-shaped optical unit 110 may not influence or may insignificantly influence light which is refracted by the liquid crystal layer 130 accommodated therein. Therefore, when the first lens-shaped optical unit 110 is configured in the aspherical shape, the first lens-shaped optical unit 110 does not almost exert an influence on vision correction, and as a result, the vision correction may be achieved by refractive power of the liquid crystal layer 130 and the second lens-shaped optical unit 120. However, the shape of the first lens-shaped optical unit 110 is just an example and the first lens-shaped optical unit 110 may be configured in an arbitrary shape.

According to some exemplary embodiments of the present disclosure, the first lens-shaped optical unit 110 may be manufactured by a glass series. For example, the glass series may include crown glass, flint glass, titanium glass, etc., but is not limited thereto, and the first lens-shaped optical unit 110 may be manufactured by various materials (e.g., films). Since the first lens-shaped optical unit 110 is manufactured by the glass series, the lens 100 according to some exemplary embodiments of the present disclosure may have a more even yield than the conventional varifocal lens manufactured by the polymer series even in the curing operation for orienting the liquid crystal layer 130.

According to some exemplary embodiments of the present disclosure, the second lens-shaped optical unit 120 may include a third optical layer 121 and a fourth optical layer 122. One side of each of the third optical layer 121 and the fourth optical layer 122 may be disposed in contact with the first lens-shaped optical unit 110. In this case, the lens 100 may be a structure in which the first lens-shaped optical unit 110 is accommodated in the second lens-shaped optical unit 120 (i.e., between the third optical layer 121 and the fourth optical layer 122).

Specifically, the inner surface of the second-lens-shaped optical unit 120 which is in contact with the first lens-shaped optical unit 110 may have a shape corresponding to an outer surface (i.e., outer surfaces of the first optical layer 111 and the second optical layer 112) of the first lens-shaped optical unit 110. For example, as illustrated in FIG. 2, the inner surfaces of the third optical layer 121 and the fourth optical layer 122 may have a plane shape corresponding to the outer surfaces of the first optical layer 111 and the second optical layer 112.

The third optical layer 121 and the fourth optical layer 122 may have a complementary structure to suppress aberration. For example, as illustrated in FIG. 2, when the outer surface of the third optical layer 121 has a concave lens shape, the outer surface of the fourth optical layer 122 may be formed in a convex lens shape. In addition, the third optical layer 121 and the fourth optical layer 122 may be formed by at least one of a concave lens, a convex lens, and an aspherical lens. In this case, the second lens-shaped optical unit 120 may provide the fixed refractive index according to a spherical structure, and thus, the second lens-shaped optical unit 120 may provide additional light refraction in addition to light refraction by the liquid crystal layer 130 through the spherical structure. Therefore, the vision correction may be achieved by the liquid crystal layer 130 (correcting the presbyopia vision) and the second lens-shaped optical unit 120 (correcting the basic vision). The types of lenses described above are only examples, and the second lens-shaped optical unit 120 may be formed by a lens having an arbitrary shape.

It is illustrated in FIG. 2 that each of the third optical layer 121 and the fourth optical layer 122 is constituted by a single layer, but the third optical layer 121 or the fourth optical layer 122 may be constituted by a plurality of layers. For example, the third optical layer 121 or the fourth optical layer 122 may be constituted by a plurality of layers including the layer for granting the fixed refractive index and the layer for correcting the astigmatism. However, the present disclosure is not limited thereto, and the third optical layer 121 and the fourth optical layer 122 may be constituted by various numbers of layers in order to perform various functions.

According to some exemplary embodiments of the present disclosure, the second lens-shaped optical unit 120 may be manufactured by the polymer series. For example, the polymer series may include allydiglicol carbonate (CR-39), polymethyl methacrylate (PMMA), polystyrene (PS), polycarbonate, etc., but the present disclosure is not limited thereto, and the second lens-shaped optical unit 120 may be made of various materials.

According to some exemplary embodiments of the present disclosure, the second lens-shaped optical unit 120 may be manufactured by an imprinting process on the first lens-shaped optical unit 110. The imprinting process, as a technology that transfers patterns, such as painting, is called nano-imprint because the imprinting process enables nano-scale pattern implementation. The imprint technology is attracting a lot of public attention as a technology capable of replacing a photolithography process in the conventional semiconductor or display field due to a simple process and low manufacturing cost thereof.

In the imprinting process, a resin is applied between a mold with a pattern and a substrate in which the pattern is to be formed to transfer the pattern of the mold to the substrate, and the imprinting process may be generally divided into a thermal curing method and a UV curing method according to a curing type of the resin. However, the present disclosure is not limited thereto, and the second lens-shaped optical unit 120 may be manufactured on the first lens-shaped optical unit 110 by using various methods, and for example, the second lens-shaped optical unit 120 may be manufactured on the first lens-shaped optical part 110 by an insert molding process.

Since the second lens-shaped optical part 120 is manufactured by the imprinting process or the insert molding process, the second lens-shaped optical part 120 may be easily manufactured on the semi-finished first lens-shaped optical part 110.

The liquid crystal layer 130 may be accommodated in the first lens-shaped optical part 110. The liquid crystal layer 130 allows the refractive index of light passing through the liquid crystal layer 130 to be changed based on a change in an array state of the liquid crystal layer 130 that is changed by a voltage applied from the transparent electrode 140, thereby allowing the focus of the lens 100 to be variable. Accordingly, the eyeglasses according to some exemplary embodiments of the present disclosure may provide the varifocal focus, so that the user is not affected in appearance, and may conveniently use the eyeglasses without the need to change the eyeglasses cumbersomely. The voltage applied to the liquid crystal layer 130 by predetermined patterns (e.g., closed curves) of the transparent electrode 140 may be adjusted so that a deviation between the refractive index of the liquid crystal layer 130 and the refractive index of the second lens-shaped optical part 120 increases from the center of the lens toward the outer periphery of the lens 100. When the eyeglasses 1000 operate, the liquid crystal layer 130 has a refractive index that is equal or similar to that of the second lens-shaped optical unit 120 at the center of the lens 100, but may have a refractive index which has a larger deviation from the refractive index of the second lens-shaped optical unit 120 at the outer periphery of the lens 100. The liquid crystal layer 130 is constituted by a plurality of regions, and the voltage applied to the liquid crystal layer 130 may be adjusted differently according to the plurality of regions so as to suppress the aberration by adjusting the refractive index of the liquid crystal layer differently according to the position on the lens 100. The second lens-shaped optical unit 120 may generally have a constant refractive index without change depending on the position on the lens 100, but when the eyeglasses 1000 operate, the refractive index of the liquid crystal layer 130 may be different at the center and the outer periphery of the lens 100. This will be described below with reference to FIGS. 6A and 6B.

The liquid crystal layer 130 may include at least one of a nematic liquid crystal, a smectic liquid crystal, a ferroelectric liquid crystal, and a chiral liquid crystal. In addition, the liquid crystal layer 130 may include different types of liquid crystals to enable fine diopter adjustment. However, the present disclosure is not limited thereto, and the liquid crystal layer 130 may include various types of liquid crystals.

According to some exemplary embodiments of the present disclosure, the liquid crystal layer 130 may correct the presbyopia vision (i.e., variable vision), and the second lens-shaped optical unit 120 may correct the basic vision. Specifically, the basic vision may generally mean vision for farsightedness, and the presbyopia vision may generally mean vision for nearsightedness. In this case, the second lens-shaped optical unit 120 may have a fixed refractive index for correcting the basic vision. That is, the second lens-shaped optical unit 120 may be manufactured in a shape having a fixed refractive index determined based on the user's basic vision. For example, when the user needs presbyopia correction of +3 diopters, the second lens-shaped optical unit 120 may be manufactured in a shape having a refractive index of +3 diopters.

In addition, the variable refractive index of the liquid crystal layer 130 may have a range for correcting the presbyopia vision. That is, the range of the variable refractive index of the liquid crystal layer 130 may be determined based on the user's presbyopia vision. For example, the range of the variable refractive index of the liquid crystal layer 130 may be determined by a difference between the basic vision and the presbyopia vision. Specifically, when the difference between the basic vision and the presbyopia vision is 1 diopter, the liquid crystal layer 130 in which the range of the variable refractive index of the liquid crystal layer 130 is 1 diopter may be used for correcting the presbyopia vision.

The liquid crystal layer 130 may have a first refractive index for correcting the user's basic vision in an off state and a second refractive index for correcting the user's presbyopia vision in an on state. Here, the off state may include a state in which the voltage is not applied to the liquid crystal layer 130 or a lower voltage is applied than that in the on state. Accordingly, the off state may mean a state in which the refractive index of the liquid crystal layer 130 is smaller than that of the on state. A first refractive index of the off state may be determined based on the user's basic vision. As described above, since the second lens-shaped optical unit 120 may have the fixed refractive index for correcting the user's basic vision, the first refractive index of the liquid crystal layer 130 in the off state may be determined to exert no influence or exert an insignificant influence on the refraction of the light by the second lens-shaped optical unit 120. For example, the first refractive index of the liquid crystal layer 130 in the off state may be a refractive index which is index-matched with the second lens-shaped optical unit 120.

Further, the on state may mean a state in which a voltage at a predetermined level or higher (specifically, a voltage higher than the voltage in the off state) is applied onto the liquid crystal layer 130. In this case, the liquid crystal layer 130 may have a second refractive index correcting the presbyopia vision. The first refractive index of the on state may be determined based on the user's presbyopia vision. For example, when the difference between the basic vision and the presbyopia vision is 1 diopter, the second refractive index of the on state may be determined as +1 diopter.

In addition, the on state may be set to several levels as needed, and may be set to have different diopters according to each level. For example, when the on state is constituted by two levels, the on state of the first level is a state in which the voltage is applied to the liquid crystal layer 130 so that the liquid crystal layer 130 has a refractive index of +1 diopter and the on state of the second level may be a state in which the voltage is applied to the liquid crystal layer 130 so that the liquid crystal layer has a refractive index of +2 diopters.

The transparent electrode 140 may be configured in a predetermined pattern so as to apply the voltage according to the position on the lens 100 to the liquid crystal layer 130. For example, the transparent electrode 140 may be constituted by a plurality of electrodes 141 and 142 disposed on both inner surfaces of the first lens-shaped optical unit 110, and in this case, the plurality of electrodes of the transparent electrode 140 may apply the voltage to the liquid crystal layer 130 in a vertical direction. Specifically, the plurality of electrodes 141 and 142 may each be constituted by one or more closed curves so as to apply the voltage according to the position on the lens 100 to the liquid crystal layer 130, and may be made of a material which may transmit light and has electrical conductivity. As another example, the transparent electrode 140 is formed of a plurality of electrodes arranged in an arbitrary pattern (for example, a grid pattern, a radiation pattern, etc.), and each electrode may receive electricity through a via hole. However, the present disclosure is not limited thereto, and the transparent electrode 140 may be configured in various methods.

The nano structure 150, as a structure having a moth eye shape or a Fresnel shape, may be positioned on the inner surface of the first lens-shaped optical unit 110. For example, the nano structure 150 may be positioned on the inner surface of the first optical layer 111 in contact with the liquid crystal layer 130. Further, as another example, the nano structure 150 may be positioned on the inner surface of the second optical layer 112 in contact with the liquid crystal layer 130.

The nanostructure 150 may increase a change in refractive index due to the liquid crystal layer 130. In addition, the nano structure 150 may reduce reflection of light so that the user of the eyeglasses 1000 may see an object more clearly. The nano structure 150 maximizes the change in refractive index due to the liquid crystal layer 130 by reducing the reflection of the light to reduce a thickness of the liquid crystal layer 130. Accordingly, since a total thickness of the lens 100 may be reduced, externally better eyeglasses 1000 may be provided to the user.

In addition, a part of the liquid crystal layer 130 may include a display unit 131 that blocks at least a part of light passing through the liquid crystal layer 130 to express information which the user of the lens 100 may recognize. The display unit 131 blocks at least a part of the light passing through the lens 100 due to distortion of liquid crystal particles of the liquid crystal layer 130, thereby expressing visual information on a part of the lens 100.

The user input unit 200 may allow the user to adjust the voltage applied to the liquid crystal layer 130 in order to change the focus of the eyeglasses 1000 according to the distance of the object which the user of the eyeglasses 1000 wants to see. The user input unit 200 may include a push button, a touch sensor, and the like, and may include any means capable of detecting an input of the user. The user input unit 200 may be disposed on a part of a frame 900 of the eyeglasses 1000. FIG. 3 illustrates that the user input unit 200 protrudes, but the user input unit 200 may be positioned on a part of a leg of the eyeglasses. In addition, the user input unit 200 may allow the user to change an operation mode of the eyeglasses in order to change the operation mode of the eyeglasses to a long-distance mode, an intermediate-distance mode, or a short-distance mode according to the distance of the object to be viewed by the user of the eyeglasses. The user may change the focus of the eyeglasses continuously through the user input unit 200 or may change the focus of the eyeglasses discontinuously according to a preset mode.

The distance measuring unit 300 may measure a distance to the object which the user of the eyeglasses 1000 wants to see. The distance measurement unit 300 may be configured by a laser sensor or an ultrasonic sensor. In addition, the distance measurement unit 300 may include an arbitrary sensor capable of measuring the distance to the object. The distance measuring unit 300 may be positioned on a part of the frame 900 of the eyeglasses in the direction of the user's gaze.

The control unit 400 may adjust the amount of the voltage applied to the liquid crystal layer 130 in order to change the focus of the eyeglasses 1000 based on the distance to the object measured by the distance measurement unit 300. Further, the control unit 400 may adjust the voltage applied to the liquid crystal layer 130 by the transparent parent 140 as described above. The control unit 400 may include one or more microprocessor, and adjusts the voltage applied to the liquid crystal layer 130 to adjust a focal distance of the eyeglasses 1000.

When power supply of the eyeglasses 1000 is stopped, the first array maintenance module 500 may maintain an array state of the liquid crystal layer 130 in order to prevent a change in refractive index as the array state of the liquid crystal layer 130 returns to an original state thereof. When the power supply of the eyeglasses 1000 is stopped, the first array maintenance module 500 may maintain the array state of the liquid crystal layer 130 even when the power supply of the eyeglasses 1000 is stopped in order to prevent the user to feel inconvenience caused by the change in refractive index as the array state of the liquid crystal layer 130 returns to the original state thereof. The first array maintenance module 500 supplies DC power to the transparent electrodes 140 and short-circuits the transparent electrodes 140 to maintain the array state of the liquid crystal layer 130. For example, in a state in which the liquid crystal layer 130 is arranged so that the user may see a short distance, the power supply of the eyeglasses 1000 is stopped and the array of the liquid crystal layer 130 returns to the original state thereof, so that when the user may not see the short distance, there may be a problem such as dizziness to the user. The first array maintenance module 500 may solve such a problem by maintaining the array state of the liquid crystal layer 130 as a last state.

When the power supply of the eyeglasses 1000 is stopped, the second array maintenance module 600 may allow the array state of the liquid crystal layer 130 to return to a predetermined state. The first and second array maintenance modules 500 and 600 apply a magnetic field to the liquid crystal layer 130 by a permanent magnet to maintain the array state of the liquid crystals (first array maintenance module 500) and allow the array state of the liquid crystal to return to the predetermined state (second array maintenance module 600). Further, the first and second alignment maintenance modules 500 and 600 apply influences of an electric field, the magnetic field, a temperature, and stress to the liquid crystal layer 130 to maintain the array state of the liquid crystal layer 130 or allow the array state to the predetermined state.

The memory unit 700 may record at least one of the voltage applied to the liquid crystal layer 130, a distortion amount of the liquid crystal layer 130, an orientation, the type of liquid crystal layer 130, a refractive index of light passing through the liquid crystal layer 130, a focal distance of the lens 100 based on the state of the liquid crystal layer 130, and vision of the user of the lens 100. The recorded information may be used to implement a database including a user's eyesight and a distance to an object, and an amount of voltage for correcting the eyesight and the distance, etc. The memory unit 700 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The aforementioned storage medium is just an example, and the memory unit 700 may include various temporary or permanent storage media.

The communication unit 800 may transmit data recorded in the memory unit 700 to an external computing device so as to allow the external computing device to generate a database related to eyesight correction. The communication unit 800 may communicate with the external computing device through wired/wireless communication. As the wireless Internet technology, wireless LAN (WLAN) (Wi-Fi), wireless broadband (Wibro), world interoperability for microwave access (Wimax), high speed downlink packet access (HSDPA), or the like, may be used. As wired Internet technology, a digital subscriber line (XDSL), fibers to the home (FTTH), power line communication (PLC), or the like may be used. Further, the communication unit 800 includes the short range communication module to transmit/receive data to/from an external computing device which is positioned at a comparatively short range from the glasses 1000 and includes the short range communication module. As short-range communication technology, Bluetooth, radio frequency identification (RFID), infrared data association (IrDA), ultra wideband (UWB), ZigBee, or the like may be used. Further, the communication unit 800 may include communication means such as universal serial bus (USB), Thunderbolt, SATA, mSATA, PCI, etc. A user terminal of the external computing device may include a personal computer (PC), a notebook, a mobile terminal, a smart phone, a tablet PC, a mainframe computer, a medium-sized computer, a large-sized computer, a server, and the like, and include all kinds of terminals which may access a wired/wireless network.

The frame 900 is coupled to a part of the lens 100 to fix the lens 100, and may have a shape to be worn by the user of the eyeglasses 1000. Further, the user input unit 200, the distance measurement unit 300, the control unit 400, the memory unit 700, the communication unit 800, etc., may be positioned in the frame 900.

FIG. 3 is a diagram for describing a method for manufacturing a lens for providing a varifocal focus according to some exemplary embodiments of the present disclosure. FIG. 4 is a diagram for describing a semi-finished lens and a finished lens according to some exemplary embodiments of the present disclosure.

As described above, the lens 100 according to some exemplary embodiments of the present disclosure may be a varifocal lens having a hybrid shape. Specifically, the lens 100 according to some exemplary embodiments of the present disclosure may be constituted by an internal layer (i.e., the first lens-shaped optical unit) manufactured by glass series (or film) to accommodate a liquid crystal layer for providing a varifocal focus therein in order to correct presbyopia vision and an external layer (i.e., the second lens-shaped optical unit) manufactured by polymer series providing a fixed refractive index for the basic vision. The internal layer that accommodates the liquid crystal layer therein is manufactured by the glass series (or film), and as a result, the lens according to some exemplary embodiments of the present disclosure may acquire an even product yield even after a curing operation for orientating the liquid crystal layer. Therefore, the lens may be advantageous for mass production.

Further, the lens according to some exemplary embodiments of the present disclosure may be configured to correct variable vision (presbyopia vision) by the liquid crystal layer accommodated in an internal layer, and correct the basic vision by an external layer. Accordingly, a semi-finished product in which only the internal layer having a suitable variable refractive index is manufactured according to variable vision required by the user is selected, and the external layer is post-finished on a pre-manufactured semi-finished product according to the basic vision required by the user through the imprinting process or insert molding process, and as a result, the lens may be finally completed. Such a manufacturing method may increase the mass production of a varifocal lens.

According to some exemplary embodiments of the present disclosure, the method for manufacturing a lens for providing the varifocal focus may include manufacturing a first lens-shaped optical unit 110 including a first optical layer 111 of which one side is in contact with one side of the liquid crystal layer 130 and a second optical layer 112 of which one side is in contact with the other side of the liquid crystal layer 130 so as to accommodate liquid crystal layers 130 variably oriented according to a voltage to have a variable refractive index therein (S110), and here, the first lens-shaped optical unit 110 may be manufactured by glass or film. FIG. 4A illustrates a semi-finished lens including the liquid crystal layer 130 and the first lens-shaped optical unit 110 manufactured through step S110.

Further, the method for manufacturing the lens for providing the varifocal focus may include manufacturing a second lens-shaped optical unit 120 including a third optical layer 121 of which one side is in contact with an outer side of the first optical layer 111 and a fourth optical unit 122 of which one side is in contact with the outer side of the second optical layer 112, and here, the second lens-shaped optical unit 120 may be manufactured by polymer series, and may have a fixed refractive index. FIG. 4B illustrates a lens completed by manufacturing the second lens-shaped optical unit 120 on the semi-finished lens.

As the manufacturing of the first lens-shaped optical unit 110 (S111), a method for manufacturing the first lens-shaped optical unit 110 so as to accommodate the liquid crystal layer 130 having the required variable refractive index according to presbyopia vision of a specific user therein is also suitable, but more preferably, a method for pre-manufacturing various types of first lens-shaped optical units 110 that accommodate liquid crystal layers having multiple ranges of variable refractive indexes without specifying the user is also desirable. When various types of semi-finished lenses (i.e., the liquid crystal layer 130 and the first lens-shaped optical unit 110 are first manufactured, see FIG. 4A) having various ranges of variable refractive indexes are first manufactured, the user may manufacture a final product (see FIG. 4B) by a method for selecting a semi-finished lens having a variable refractive index suitable therefor among them and post-finishing the second lens-shaped optical unit 120 on the semi-finished product according to the basic vision thereof.

Such a method is a very suitable method for mass production of products, and in particular, since the first lens-shaped optical unit according to the present disclosure is manufactured by the glass series that is advantageous for the orientation of the liquid crystal layer, a product yield may be superior to that of lenses manufactured only by the existing polymer series.

Specifically, a variable refractive index required for correcting the presbyopia vision and a fixed refractive index for correcting the basic vision may vary according to each user. Therefore, after first mass-producing the internal layer responsible for the variable refractive index, which is difficult in a product production process (i.e., step S110), the external layer responsible for the fixed refractive index for correcting the user's basic vision is manufactured through relatively easy post-finishing (e.g., the imprinting process or insert molding process) (i.e., step S120), and as a result, mass production of the product is enabled, and the product yield may be maximized.

FIG. 5 is a perspective view illustrating an example of an external appearance of eyeglasses 1000 for providing a varifocal focus according to some exemplary embodiments of the present disclosure. The eyeglasses 1000 for providing the varifocal focus according to an exemplary embodiment of the present disclosure may include a frame 900 which fixes the lens and may be worn by the user, a lens 100 fixed to the frame, a user input unit 200 which may be positioned in the frame, a distance measurement unit 300, a memory unit 700, and a communication unit 800.

The lens 100 may accommodate the liquid crystal layer 130 therein. The liquid crystal layer 130 may be positioned in a part of the lens 100. In addition, a transparent electrode 140 for applying the voltage to the liquid crystal layer 130 may be positioned on the lens 100.

In addition, the lens 100 may include a display unit 131 including visual information which may be recognized by a wearer of the eyeglasses 1000 by the liquid crystal layer 130. The display unit 131 may be positioned on a part of the lens 100 and positioned on a part of a region occupied by the liquid crystal layer 130 in the lens.

The user input unit 200 is positioned on the side of the eyeglasses 1000 to be easily operated by the user of the eyeglasses 1000. The distance measurement unit 300 may be positioned to face a front side and may measure a distance from an object viewed by the gaze of the user wearing the eyeglasses 1000.

Although not illustrated in FIG. 5, the communication unit 800 may also be positioned on the frame 900 of the eyeglasses 1000. The user may connect a cable to the communication unit 800 so that a computing device and the eyeglasses 1000 communicate. The communication unit 800 may include a structure capable of accommodating the cable for this. In addition, the communication unit 800 may be configured by a wireless communication means, and in this case, may not include the structure capable of accommodating the cable.

FIG. 6A is a diagram illustrating that lenses of eyeglasses operate to correct hyperopia according to some exemplary embodiments of the present disclosure. In an example illustrated in FIG. 6A, a concave lens is illustrated in order to describe the operation of the liquid crystal layer 130, and the eyeglasses 1000 including the liquid crystal layer 130 for providing the varifocal focus according to an exemplary embodiment of the present disclosure may operate in a corresponding method for a concave lens or an aspherical lens.

When the voltage is applied to the liquid crystal layer 130, as the voltage applied to the liquid crystal layer 130 increases, light condensing characteristics of the third optical layer 121 and the fourth optical layer 122 may be reduced. In hyperopia, an image is positioned at the back of the retina in the eye, and since the image should be positioned on the retina using the eyeglasses, etc., a position where the image is formed should be pulled more forward than a current state. To this end, the voltage applied to the liquid crystal layer 130 is weakly applied as the position on the lens 100 is closer to the outer periphery, and the refractive index should increase as the position on the lens 100 is closer to the outer periphery (a region to which $V_o$ is applied in the example of FIG. 4A). Therefore, a stronger voltage ($V_o < V_m < V_c$) may be applied from the lens 100 toward the center by the transparent electrode 140. As a result, liquid crystal particles of the liquid crystal layer 130 positioned on the outer periphery of the lens 100 are the least distorted and the refractive index of the liquid crystal layer 130 is largest on the outer periphery of the lens 100. When it is assumed that a refractive index ($n_1$) of the third optical layer 121 is constant according to the position on the lens 100, the refractive index of the liquid crystal may be the lowest at the center and may increase toward the outer periphery ($n_c < n_o$). When it is assumed that a refractive index ($n_c$) of the center of the liquid crystal layer 130 is equal to the refractive index of the third optical layer 121, a deviation in refractive index between the liquid crystal layer 130 and the third optical layer 121 increases from the center to the outer periphery of the lens 100. By such a method, the voltage applied to the liquid crystal layer 130 varies depending on the position on the lens 100 to vary the refractive index of the liquid crystal layer 130, thereby removing aberration. In the example of FIG. 6A, it is illustrated that a refractive index ($n_2$) of the fourth optical layer 122 is equal to the refractive index ($n_1$) of the third optical layer 121, but the refractive indexes may be different from each other. The refractive index of the third optical layer 121 is described as being the same depending on the position on the lens 100, but may be different, and the refractive index of the liquid crystal layer 130 may be controlled so that the deviation in refractive index between the third and fourth optical layers increases from the center toward the outer periphery of the lens 100 in order to remove the aberration. In the eyeglasses 1000 according to an exemplary embodiment of the present disclosure, the voltage is applied to the liquid crystal layer 130, which operates, and as a result, as compared with a case where the liquid crystal layer 130 does not operate, the light condensing characteristics are enhanced to correct the hyperopia by pulling an image formed on the eye of the user of the eyeglasses 1000 to the retina.

FIG. 6B is a diagram illustrating that lenses of eyeglasses operate to correct myopia according to the present disclosure.

In the example illustrated in FIG. 6B, the third optical layer 121 and the fourth optical layer 122 of the eyeglasses 1000 are illustrated as convex lenses having a characteristic of condensing light, but the eyeglasses 1000 including the liquid crystal layer 130 for providing the varifocal focus according to an exemplary embodiment of the present disclosure may operate in a corresponding method for the concave lens or aspherical lens.

When the voltage is applied to the liquid crystal layer 130, as the voltage applied to the liquid crystal layer 130 increases, light condensing characteristics of the third and fourth optical layers 121 and 122 may be reduced. In myopia, an image is positioned at the back of the retina in the eye, and since the image should be positioned on the retina using the eyeglasses, etc., a position where the image is formed should be pulled more backward than the current state. To this end, the voltage applied to the liquid crystal layer 130 is strongly applied as the position on the lens 100 is closer to the outer periphery, and the refractive index should decrease as the position on the lens 100 is closer to the outer periphery (a region to which $V_o$ is applied in the example of FIG. 6B). Therefore, a stronger voltage ($V_o > V_m > V_c$) may be applied from the lens 100 toward the outer periphery by the transparent electrode 140. As a result, liquid crystal particles of the liquid crystal layer 130 positioned on the outer periphery of the lens 100 are most distorted and the refractive index of the liquid crystal layer 130 is smallest on the outer periphery of the lens 100. When it is assumed that the refractive index ($n_1$) of the third optical layer 121 is constant according to the position on the lens 100, the refractive index of the liquid crystal may be the lowest at the center and may decrease toward the outer periphery ($n_c > n_o$). When it is assumed that the refractive index ($n_c$) of the center of the liquid crystal layer 130 is equal to the refractive index of the third optical layer 121, a deviation in refractive index between the liquid crystal layer 130 and the third optical layer 121 increases from the center to the outer periphery of the lens 100. By such a method, the voltage applied to the liquid crystal layer 130 varies depending on the position on the lens 100 to vary the refractive index of the liquid crystal layer 130, thereby removing aberration. In the example of FIG. 6B, it is illustrated that the refractive index ($n_2$) of the fourth optical layer 122 is equal to the refractive index ($n_1$) of the third optical layer 121, but the refractive indexes may be different from each other. The refractive index of the third optical layer 121 is described as being the same depending on the position on the lens 100, but may be different, and the refractive index of the liquid crystal layer 130 may be controlled so that the deviation in refractive index between the third and fourth optical layers increases from the center toward the outer periphery of the lens 100 in order to remove the aberration. In the eyeglasses 1000 according to an exemplary embodiment of the present disclosure, the voltage is applied to the liquid crystal layer 130, which operates, and as a result, as compared with a case where the liquid crystal layer 130 does not operate, the light condensing characteristics are weakened to correct the myopia by pulling an image formed on the eye of the user of the eyeglasses 1000 to the retina.

It will be appreciated by those skilled in the art that information and signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

It may be appreciated by those skilled in the art that various exemplary logical blocks, modules, processors, means, circuits, and algorithm steps described in association with the exemplary embodiments disclosed herein may be implemented by electronic hardware, various types of programs or design codes (for easy description, herein, designated as "software"), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be interpreted that the implementation determination departs from the scope of the present disclosure.

Various embodiments presented herein may be implemented as manufactured articles using a method, an apparatus, or a standard programming and/or engineering technique. The term "manufactured article" includes a computer program, a carrier, or a medium which is accessible by a predetermined computer readable device. For example, a computer readable medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information. The term "machine-readable media" includes a wireless channel and various other media that can store, possess, and/or transfer instruction(s) and/or data, but is not limited thereto.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but the method claims are not limited to the presented specific order or hierarchical structure.

The description of the presented embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the embodiments presented herein, but should be interpreted within the widest range which is coherent with the principles and new features presented herein.

What is claimed is:

1. A lens, comprising:
    a variable refractive layer having a variable refractive index;
    a first lens-shaped optical unit including a first optical layer having one side in contact with one side of the variable refractive layer and a second optical layer having one side in contact with the other side of the variable refractive layer; and
    a second lens-shaped optical unit having a fixed refractive index, and including a third optical layer having one side in contact with an outer surface of the first optical layer and a fourth optical layer having one side in contact with an outer surface of the second optical layer;
    the lens is manufactured by: (i) selecting a semi-finished lens corresponding to a first vision of a user among a plurality of semi-finished lenses respectively corresponding to a predetermined variable refractive power, wherein the selected semi-finished lens includes the first lens-shaped optical unit, and the variable refractive layer having a range of a variable refractive index corresponding to the first vision of the user, and (ii) manufacturing a post-finished lens corresponding to a second vision of the user by using the selected semi-finished lens, wherein the post-finished lens includes the second lens-shaped optical unit having a fixed refractive index corresponding to the second vision of the user; and
    wherein the outer surface of the first optical layer and the outer surface of the second optical layer are substantially planar.

2. The lens according to claim 1,
    wherein the second lens-shaped optical unit of the post-finished lens is manufactured by an imprinting process on the first lens-shaped optical unit of the semi-finished lens.

3. The lens according to claim 1,
    wherein the second lens-shaped optical unit of the post-finished lens is manufactured by an insert process on the first lens-shaped optical unit of the semi-finished lens.

4. The lens according to claim 1,
    wherein the first vision is a presbyopia vision, and the second vision is a basic vision, and wherein the variable refractive layer has the range of the variable refractive index corresponding to a difference between a first refractive index corresponding to the basic vision and a second refractive index corresponding to the presbyopia vision.

5. The lens according to claim 1,
    wherein the first lens-shaped optical unit is made of glass or film, and the second lens-shaped optical unit is made of a polymer-based material.

6. The lens according to claim 1, further comprising:
    a transparent electrode configured in a predetermined pattern so as to apply a voltage according to a position on the lens to the variable refractive layer, and positioned on one side of the first lens-shaped optical unit.

7. A method of manufacturing a lens, comprising:
    (i) selecting a semi-finished lens corresponding to a first vision of a user among a plurality of semi-finished lenses respectively corresponding to a predetermined variable refractive power, wherein the selected semi-finished lens includes a variable refractive layer having a range of a variable refractive index corresponding to the first vision of the user, and a first lens-shaped optical unit including a first optical layer having one side in contact with one side of the variable refractive layer and a second optical layer having one side in contact with the other side of the variable refractive layer; and
    (ii) manufacturing a post-finished lens corresponding to a second vision of the user by using the selected semi-finished lens, wherein the post-finished lens includes a second lens-shaped optical unit having a fixed refractive index corresponding to the second vision of the user, wherein the second lens-shaped optical unit includes a third optical layer having one side in contact with an outer surface of the first optical layer and a fourth optical layer having one side in contact with an outer surface of the second optical layer; and
    wherein the outer surface of the first optical layer and the outer surface of the second optical layer are substantially planar.

8. The method of manufacturing the lens according to claim 7,
    wherein the second lens-shaped optical unit of the post-finished lens is manufactured by an imprinting process on the first lens-shaped optical unit of the semi-finished lens.

9. The method of manufacturing the lens according to claim 7,
    wherein the second lens-shaped optical unit of the post-finished lens is manufactured by an insert process on the first lens-shaped optical unit of the semi-finished lens.

10. Eyeglasses, comprising:
    a lens for providing varifocal focus; and
    a frame coupled to a part of the lens to fix the lens, and having a shape to be worn by a user of the eyeglasses;
    wherein the lens comprising:
    a variable refractive layer having a variable refractive index;
    a first lens-shaped optical unit including a first optical layer having one side in contact with one side of the variable refractive layer and a second optical layer having one side in contact with the other side of the variable refractive layer; and
    a second lens-shaped optical unit having a fixed refractive index, and including a third optical layer having one side in contact with an outer surface of the first optical layer and a fourth optical layer having one side in contact with an outer surface of the second optical layer;
    the lens is manufactured by: (i) selecting a semi-finished lens corresponding to a first vision of a user among a plurality of semi-finished lenses respectively corresponding to a predetermined variable refractive power, wherein the selected semi-finished lens includes the first lens-shaped optical unit, and the variable refractive layer having a range of a variable refractive index corresponding to the first vision of the user, and (ii) manufacturing a post-finished lens corresponding to a second vision of the user by using the selected semi-finished lens, wherein the post-finished lens includes the second lens-shaped optical unit having a fixed refractive index corresponding to the second vision of the user, and wherein the outer surface of the first optical layer and the outer surface of the second optical layer are substantially planar.

11. The eyeglasses according to claim 10, wherein the second lens-shaped optical unit of the post-finished lens is manufactured by an imprinting process on the first lens-shaped optical unit of the semi-finished lens.

12. The eyeglasses according to claim 10, wherein the second lens-shaped optical unit of the post-finished lens is manufactured by an insert process on the first lens-shaped optical unit of the semi-finished lens.

13. A display device, comprising:

a lens for providing varifocal focus; and a frame coupled to a part of the lens to fix the lens, and having a shape to be worn by a user of eyeglasses comprising the frame and the lens;

wherein the lens comprising:

a variable refractive layer having a variable refractive index;

a first lens-shaped optical unit including a first optical layer having one side in contact with one side of the variable refractive layer and a second optical layer having one side in contact with the other side of the variable refractive layer; and a second lens-shaped optical unit having a fixed refractive index, and including a third optical layer having one side in contact with an outer surface of the first optical layer and a fourth optical layer having one side in contact with an outer surface of the second optical layer;

the lens is manufactured by: (i) selecting a semi-finished lens corresponding to a first vision of a user among a plurality of semi-finished lenses respectively corresponding to a predetermined variable refractive power, wherein the selected semi-finished lens includes the first lens-shaped optical unit and the variable refractive layer having a range of a variable refractive index corresponding to the first vision of the user, and (ii) manufacturing a post-finished lens corresponding to a second vision of the user by using the selected semi-finished lens, wherein the post-finished lens includes the second lens-shaped optical unit having a fixed refractive index corresponding to the second vision of the user, and wherein the outer surface of the first optical layer and the outer surface of the second optical layer are substantially planar.

\* \* \* \* \*